(12) United States Patent
Hureaux et al.

(10) Patent No.: US 8,708,076 B2
(45) Date of Patent: Apr. 29, 2014

(54) AUTOMOBILE COMPRISING AN ELECTRIC ENGINE POWERED BY A POWER SUPPLY MODULE

(75) Inventors: Sebastien Hureaux, Magny d'anigon (FR); Flavien Berger, Sainte Suzanne (FR); Eric Alpy, Etupes (FR); Maxime Spehner, Sainte Suzanne (FR); Benoit Luc, Saint Maurice Colombier (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 184 days.

(21) Appl. No.: 13/382,274

(22) PCT Filed: Jun. 28, 2010

(86) PCT No.: PCT/FR2010/051336
§ 371 (c)(1),
(2), (4) Date: Jan. 4, 2012

(87) PCT Pub. No.: WO2011/007072
PCT Pub. Date: Jan. 20, 2011

(65) Prior Publication Data
US 2012/0103707 A1    May 3, 2012

(30) Foreign Application Priority Data
Jul. 17, 2009 (FR) .................................. 09 54996

(51) Int. Cl.
*B60L 11/00* (2006.01)
(52) U.S. Cl.
USPC ....................................... 180/68.1; 180/65.1

(58) Field of Classification Search
USPC ........... 180/65.1, 68.1, 65.22, 296, 309, 68.2, 180/68.5; 361/690; 454/75, 140, 159; 320/150; 62/186
See application file for complete search history.

(56) References Cited

U.S. PATENT DOCUMENTS

| 5,392,873 | A | * | 2/1995 | Masuyama et al. | 180/68.5 |
| 5,490,572 | A | * | 2/1996 | Tajiri et al. | 180/65.1 |
| 5,937,664 | A | * | 8/1999 | Matsuno et al. | 62/259.2 |
| 6,094,927 | A | * | 8/2000 | Anazawa et al. | 62/239 |
| 6,188,574 | B1 | * | 2/2001 | Anazawa | 361/695 |
| 6,211,646 | B1 | * | 4/2001 | Kouzu et al. | 320/107 |
| 6,220,383 | B1 | * | 4/2001 | Muraki et al. | 180/68.5 |
| 6,315,069 | B1 | * | 11/2001 | Suba et al. | 180/68.5 |

(Continued)

FOREIGN PATENT DOCUMENTS

DE    19848646 A1    4/2000
JP    10252467    9/1998

OTHER PUBLICATIONS

International Search Report for PCT application PCT/FR2010/051336 mailed Oct. 1, 2010.

*Primary Examiner* — Katy M Ebner
*Assistant Examiner* — Brodie Follman
(74) *Attorney, Agent, or Firm* — Polster Lieder Woodruff & Lucchesi, L.C.

(57) ABSTRACT

The invention relates to an automobile, comprising an electric engine powered by a power supply module (10) to which a pipe (11) for extracting the hot air generated by said module is connected, and a structure including a floor (2) defining the lower portion of the vehicle passenger compartment. According to the invention, one of the ends (12) of said extraction pipe (11) is in communication with an opening (3) formed in the floor (2) of the vehicle.

8 Claims, 2 Drawing Sheets

(56) References Cited

U.S. PATENT DOCUMENTS

| | | | |
|---|---|---|---|
| 6,443,253 B1* | 9/2002 | Whitehead et al. | 180/68.1 |
| 6,541,151 B2* | 4/2003 | Minamiura et al. | 429/98 |
| 6,662,891 B2* | 12/2003 | Misu et al. | 180/68.1 |
| 6,931,878 B2* | 8/2005 | Kubota et al. | 62/259.2 |
| 7,004,274 B2* | 2/2006 | Shibasawa et al. | 180/68.5 |
| 7,451,608 B2* | 11/2008 | Kikuchi | 62/186 |
| 7,455,136 B2* | 11/2008 | Pleune et al. | 180/68.1 |
| 7,511,455 B2* | 3/2009 | Yoneda | 320/112 |
| 7,556,302 B2* | 7/2009 | Sakai et al. | 296/37.16 |
| 7,635,040 B2* | 12/2009 | Seo et al. | 180/68.1 |
| 7,654,351 B2* | 2/2010 | Koike et al. | 180/68.5 |
| 7,688,582 B2* | 3/2010 | Fukazu et al. | 361/690 |
| 7,733,065 B2* | 6/2010 | Yoon et al. | 320/150 |
| 7,900,727 B2* | 3/2011 | Shinmura | 180/68.1 |
| 7,905,307 B2* | 3/2011 | Kubota et al. | 180/68.1 |
| 8,029,343 B2* | 10/2011 | Major et al. | 454/70 |
| 8,042,637 B2* | 10/2011 | Nagata et al. | 180/68.5 |
| 8,048,554 B2* | 11/2011 | Yang | 429/120 |
| 8,251,169 B2* | 8/2012 | Fujiwara | 180/68.1 |
| 8,276,696 B2* | 10/2012 | Lucas | 180/68.2 |
| 8,430,194 B2* | 4/2013 | Yamatani | 180/68.1 |
| 2001/0026887 A1* | 10/2001 | Minamiura et al. | 429/120 |
| 2001/0030069 A1* | 10/2001 | Misu et al. | 180/68.1 |
| 2002/0035973 A1* | 3/2002 | Takahashi | 123/41.29 |
| 2003/0186115 A1* | 10/2003 | Shibasawa et al. | 429/100 |
| 2003/0199243 A1* | 10/2003 | Castiglione | 454/137 |
| 2005/0285563 A1* | 12/2005 | Yoneda | 320/112 |
| 2006/0048984 A1* | 3/2006 | Pleune et al. | 180/68.4 |
| 2007/0040418 A1* | 2/2007 | Ohkuma et al. | 297/15 |
| 2007/0216371 A1* | 9/2007 | Yoon et al. | 320/150 |
| 2007/0238015 A1* | 10/2007 | Kubota et al. | 429/120 |
| 2008/0196957 A1* | 8/2008 | Koike et al. | 180/68.5 |
| 2008/0277968 A1* | 11/2008 | Egawa et al. | 296/193.08 |
| 2009/0033120 A1* | 2/2009 | Sakai et al. | 296/37.16 |
| 2009/0152031 A1* | 6/2009 | Lim | 180/68.1 |
| 2009/0167077 A1* | 7/2009 | Tsuchiya et al. | 307/9.1 |
| 2009/0260905 A1* | 10/2009 | Shinmura | 180/68.1 |
| 2010/0060040 A1* | 3/2010 | Yasuhara et al. | 296/203.04 |
| 2010/0089675 A1* | 4/2010 | Nagata et al. | 180/68.5 |
| 2010/0099019 A1* | 4/2010 | Nagata et al. | 429/120 |
| 2010/0276220 A1* | 11/2010 | Kubota et al. | 180/68.1 |
| 2010/0294580 A1* | 11/2010 | Kubota et al. | 180/68.1 |
| 2011/0165830 A1* | 7/2011 | Smith | 454/75 |
| 2011/0222240 A1* | 9/2011 | Kawata et al. | 361/690 |
| 2011/0240251 A1* | 10/2011 | Fujiwara | 165/51 |
| 2012/0103707 A1* | 5/2012 | Hureaux et al. | 180/65.1 |
| 2013/0092348 A1* | 4/2013 | Bito | 165/41 |
| 2013/0122338 A1* | 5/2013 | Katayama et al. | 429/83 |
| 2013/0187449 A1* | 7/2013 | Mouri et al. | 307/10.1 |

* cited by examiner

AUTOMOBILE COMPRISING AN ELECTRIC ENGINE POWERED BY A POWER SUPPLY MODULE

CROSS-REFERENCE TO RELATED APPLICATIONS

This application is the US National stage, under 35 U.S.C. §371, of International App. No. PCT/FR2010/051336 which claims the priority to French Application No. 0954996 which was filed on Jul. 17, 2009.

BACKGROUND OF THE INVENTION

The present invention relates to an automotive vehicle comprising an electric motor powered by a power supply module, and a structure comprising a floor plate delimiting the lower part of the vehicle cabin.

Traditionally, an exhaust duct is connected to the power supply module in order to evacuate the hot air produced in the power supply module during its operation.

It is indeed necessary to evacuate the hot air produced by the power supply module, for instance a battery, in order to ensure its proper functioning. If the hot air is not evacuated, the power supply module and its different components run the risk of being damaged, resulting in their breakdown.

In addition, if the hot air is not evacuated it may cause discomfort to the passengers.

It is therefore necessary to provide for the evacuation of the hot air.

As shown in US2008/1096957, the free end of the exhaust duct can be located between the external skin of the vehicle and a trim panel of the trunk.

However, this location requires an adaptation of the external skin of the vehicle and/or its various linings, which entails an extra cost when these parts must be common for vehicles equipped with internal combustion, electrical and/or hybrid powertrains.

BRIEF SUMMARY

The goal of the invention is to remedy this disadvantage by proposing a concept which avoids the above mentioned problems, while ensuring proper evacuation of the heat.

Therefore, the goal of the invention is an automotive vehicle comprising an electric motor powered by a power supply module to which is connected an exhaust duct for the hot air produced by the module. A structure comprising a floor plate delimits or defines the lower part of the vehicle cabin, and one of the extremities of the exhaust duct leads to an opening made in the floor plate of the vehicle.

According to specific implementation modes, the vehicle comprises one or more of the following characteristics, taken in isolation or in all possible technical combinations:
  the extremity of the exhaust duct can be mounted to the opening by means of a flange which is shaped complimentary to the opening;
  the perimeter of the opening can comprise a rib in order to ensure a tight seal between the edge of the opening and the flange;
  a seal may be installed between the edge of the opening and the rib;
  the opening can be situated between a cross beam delimiting the rear wall of the trunk of the vehicle and a wheel well delimiting a part of the housing surrounding the upper part of a wheel;
  the opening can be situated between a part fixed to the floor plate, extending in vertical direction, and a frame bar supporting the sheet metal forming the floor surface;
  the opening can be situated between a closing part linking the cross beam to the wheel well and a frame bar extending between the wheel well and the power supply module;
  a blower, used to accelerate the evacuation of hot air, can be installed upstream of the extremity of the exhaust duct and downstream of the power supply module;
  the power supply module can include a battery.

BRIEF DESCRIPTION OF THE SEVERAL VIEWS OF THE DRAWINGS

The characteristics and advantages of the invention will become clear in the following description, given for illustrative purposes and with reference to the attached drawings, in which.

DETAILED DESCRIPTION

Figure 1:
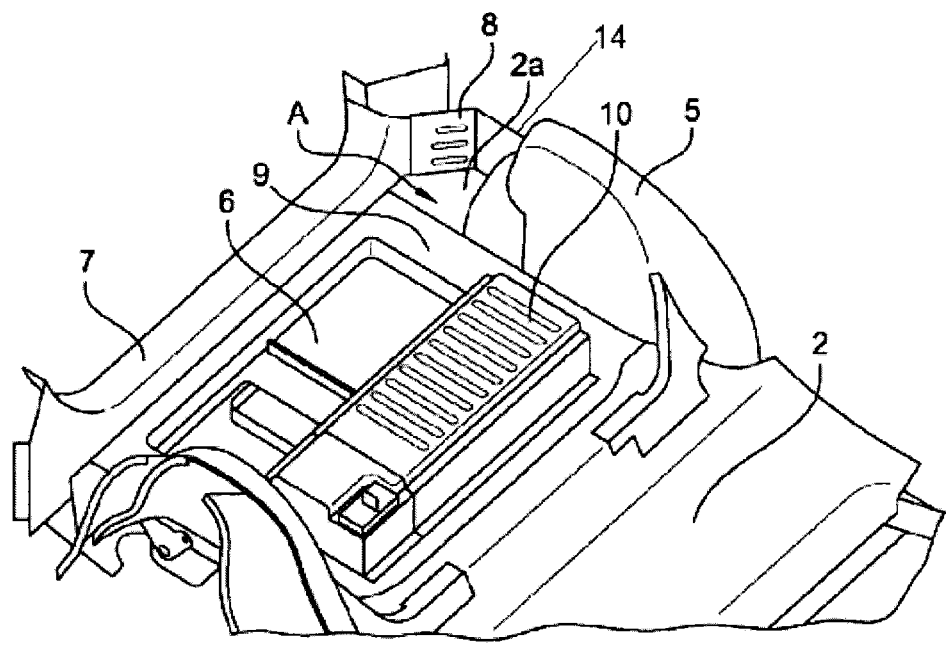
FIG. 1 is a schematic view in perspective of the rear end of an automotive vehicle in which a battery is installed.
Figure 2:
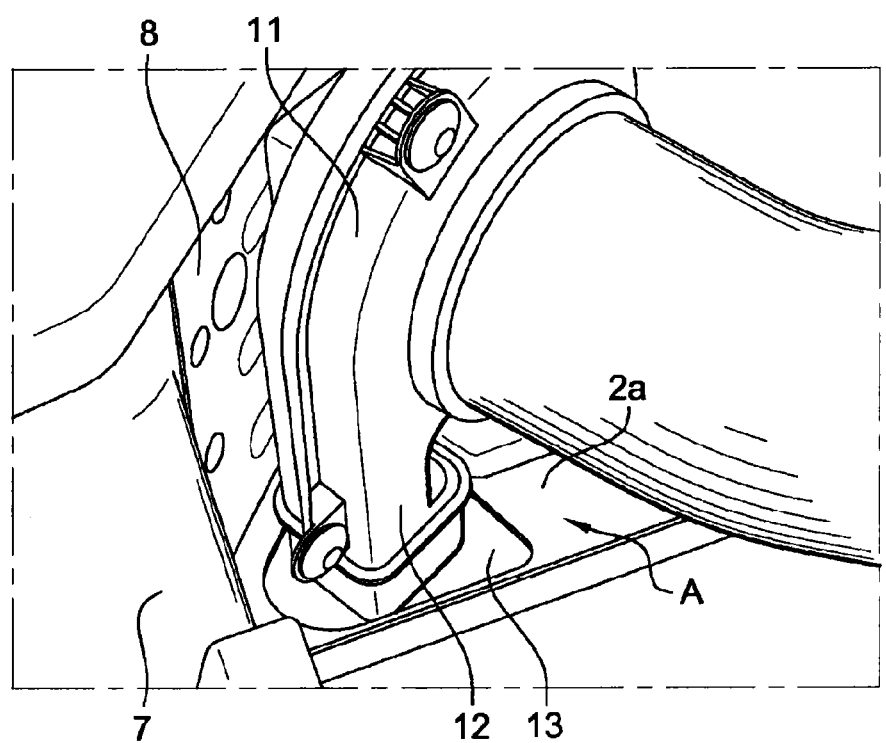
FIG. 2 is a schematic view in perspective of a zone of the rear end shown in FIG. 1, in which is situated an evacuation system for the hot air of the battery.
Figure 3:
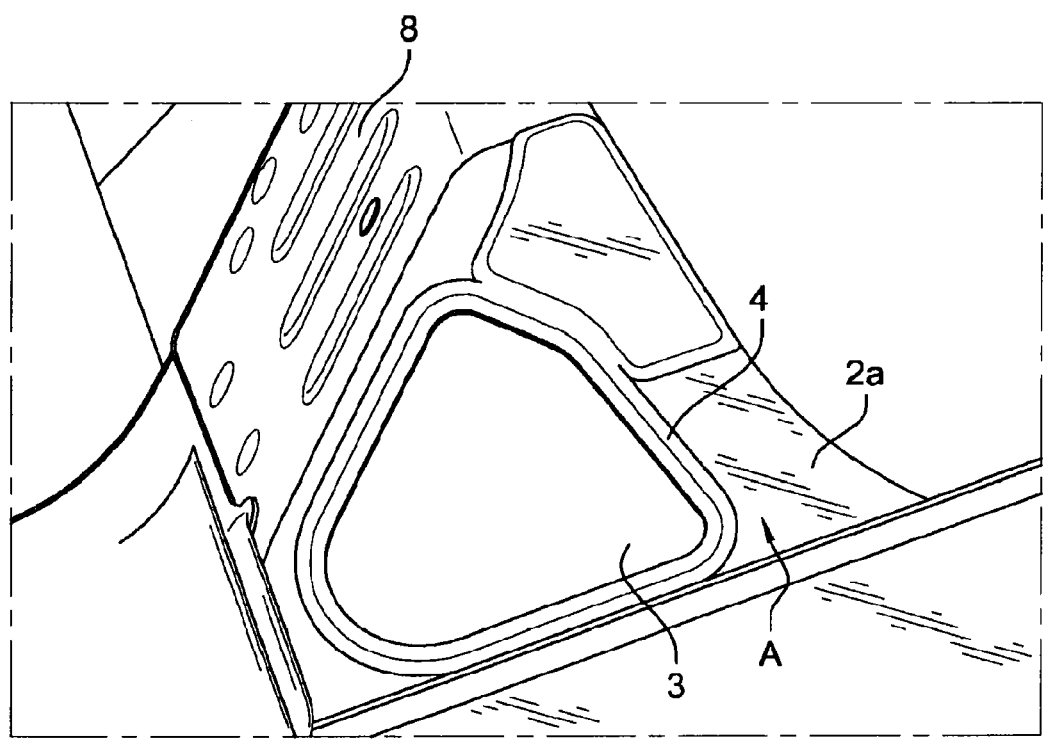
FIG. 3 is a view of a part of the floor plate shown in FIG. 2 with the hot air evacuation system removed.

FIG. 1 shows a portion of the structure 1 of the vehicle. This vehicle comprises an electric motor powered by a power supply module 10.

In a known manner, structure 1 comprises at least a floor plate, delimiting the lower part of the vehicle cabin, which carries elements intended for construction the inside of the vehicle. In FIG. 1, only the rear portion 2 of the floor plate is shown.

The floor plate is made in a traditional manner by an assembly of stamped plates, which are welded together. Furthermore, the floor plate comprises structural elements such as frame bars and cross beams, not shown, supporting the sheet metal forming the surface of the floor; and in particular the sheet metal 9 forming the load carrying floor plate situated in the trunk 6 of the vehicle.

The rear end of the vehicle, shown in FIG. 1, comprises a trunk 6 of which the upper part is delimited by a trunk panel, not shown, and the rear part by a cross beam 7 and the lower part by the load carrying floor plate 9.

In the following, we will only describe the left side of the vehicle, comprising the zone of the invention; while the right side corresponds with a traditional arrangement.

As shown in FIG. 1, a wheel well 5 extending in vertical direction is welded to the load carrying floor plate 9 and to the frame bar 14 arranged in its proximity. The upper part of the wheel well 5 is fixed to the external skin of the vehicle, not shown, through the intermediary of structural parts, not shown, in order to delimit a housing receiving the upper part of the wheel.

A closing part 8, extending in vertical direction, is welded to the load carrying floor plate 9 and connects cross beam 7 to wheel well 5 in such a manner as to delimit a zone A between cross beam 7, closing part 8, and wheel well 5 and, in its lower part by a portion 2a of the load carrying floor plate 9 delimited by a frame bar, not shown, extending between the wheel well 5 and the power supply module 10.

The power supply module 10 is installed near the load carrying floor plate 9, in the proximity of the trunk 6 of the vehicle, behind the second row of seats. It is mounted to cross beams or frame bars spaced nearby.

The power supply module 10 can include any device intended to transmit energy and/or power to the electric motor. This device can for instance comprise unitary elements, such as lead acid batteries, Li-ion cells, with prismatic or cylindrical shape, or shaped like a soft bag and connected to each other by electrical circuits. The power supply module 10 further comprises a container and cover, forming a rigid storage place, intended to receive and protect the device transmitting energy and/or power. In the example shown in FIG. 1, the power supply module 10 is a battery.

The extraction of hot air from the battery 10 takes place through the intermediary of a pipe 11. The extremity 12 of this pipe leads the air towards the exterior of the vehicle. A blower, not shown, located upstream of extremity 12 and downstream of the battery 10, is used to accelerate the evacuation of hot air.

The extremity 12 of the pipe 11 leads to an orifice 3 made in the floor plate 2 of the vehicle. The extremity 12 of the pipe 11 is mounted by means of a flange 13 secured to the pipe extremity 12. The orifice 3 and flange 13 are shaped complementarily to each other in order to install flange 13 on orifice 13 in sealed manner. According to the shown implementation mode, the orifice 3 and flange 13 have a triangular shape.

More specifically, orifice 3 is formed in part 2a of the load carrying floor plate 9 located in the above-described zone A. Orifice 3 is located between cross beam 7 and wheel well 5 and between closing piece 8 and the frame bar extending between wheel well 5 and the power supply module 10.

Preferably, a rib 4 is provided in the perimeter of orifice 3 at a distance of 5 to 20 mm from the edge of orifice 3. This rib 4 is formed in a stamping operation and has the shape of a bead.

The purpose of this rib 4 is to improve the sealing between the edge of orifice 3 and flange 13 in order to avoid noise due to leaks of hot air coming from pipe 11 and air entering between these parts at certain driving speeds of the vehicle.

In addition, rib 4 prevents infiltration of moisture or contamination.

Preferably, a seal, not shown, is installed between the edge of orifice 3 and rib 4.

Advantageously, an interior trim, not shown, masks pipe 11 and the above-described hot air evacuation system, in other words flange 13 and orifice 3. Thus the blower, pipe 11 and the hot air evacuation system are installed between the exterior panel of the vehicle and the interior trim in such way that they are masked and therefore not visible to the user of the vehicle.

In view of the above-described hot air evacuation system, the exterior skin of the vehicle and its various linings need not be adapted and remain the same regardless of whether the vehicle, designed according to the above-described structure, has internal combustion, hybrid or electric propulsion. The floor plates of vehicles requiring this feature are adapted by performing only a cutting and forming operation, in order to make the rib. These operations entail a simple and inexpensive modification of the tooling used to produce floor plate 2.

In addition, the location of this installation limits for the passengers the noise nuisance due to the operation of the blower.

Obviously, the invention is not limited to the above-described implementation mode. The extremity of the hot air exhaust duct can be connected to other appropriate locations of the floor.

The invention claimed is:

1. An automotive vehicle comprising an electric motor powered by a power supply module to which is connected an exhaust duct for hot air produced by said power supply module; said exhaust duct being in communication with an opening in a floor plate of a trunk of the vehicle; the trunk being defined in part by the floor plate, a cross-beam at a rear of the trunk, a wheel well, and a frame bar extending from the wheel well toward the cross-beam which supports sheet metal forming the surface of floor plate; the opening being positioned proximate the frame bar between the cross beam and the wheel well.

2. The vehicle according to claim 1, wherein the extremity of the exhaust duct is mounted to the opening by means of a flange, and the opening and flange being shaped complementarily to each other.

3. The vehicle according to claim 2, wherein the perimeter of the opening comprises a rib in order to ensure a seal between the edge of the opening and the flange.

4. The vehicle according to claim 3, wherein a seal is installed between the edge of opening and the rib.

5. The vehicle according to claim 1, wherein the opening is situated between a closing part which is fixed to the floor and extends in a vertical direction, and the frame bar.

6. The vehicle according to claim 5, wherein the opening is situated between the closing part and a second frame bar; said second frame bar extending between the wheel well and the power supply module.

7. The vehicle according to claim 1, wherein a blower, used to accelerate the evacuation of hot air, is installed upstream of the extremity of the exhaust duct and downstream of the power supply module.

8. The vehicle according to claim 1, wherein the power supply module comprises a battery.

\* \* \* \* \*